(12) United States Patent
VanderDrift

(10) Patent No.: US 9,524,345 B1
(45) Date of Patent: Dec. 20, 2016

(54) ENHANCING CONTENT USING LINKED CONTEXT

(76) Inventor: Richard VanderDrift, Larkspur, CA (US)

( * ) Notice: Subject to any disclaimer, the term of this patent is extended or adjusted under 35 U.S.C. 154(b) by 0 days.

(21) Appl. No.: 12/869,575

(22) Filed: Aug. 26, 2010

Related U.S. Application Data

(60) Provisional application No. 61/275,496, filed on Aug. 31, 2009.

(51) Int. Cl.
*G06F 17/30* (2006.01)

(52) U.S. Cl.
CPC ..... *G06F 17/30867* (2013.01); *G06F 17/3053* (2013.01)

(58) Field of Classification Search
CPC ........... G06F 17/30867; G06F 17/3053; G06F 17/30997
USPC .................................................. 707/723, 758
See application file for complete search history.

(56) References Cited

U.S. PATENT DOCUMENTS

| | | | |
|---|---|---|---|
| 5,752,242 A * | 5/1998 | Havens | |
| 5,794,006 A | 8/1998 | Sanderman | |
| 6,016,394 A | 1/2000 | Walker | |
| 6,442,545 B1 * | 8/2002 | Feldman et al. | |
| 6,668,325 B1 | 12/2003 | Collberg et al. | |
| 7,031,957 B2 | 4/2006 | Harris | |
| 7,089,237 B2 * | 8/2006 | Turnbull et al. | |
| 7,111,229 B2 | 9/2006 | Nicholas et al. | |
| 7,325,193 B2 | 1/2008 | Edd et al. | |
| 7,493,329 B2 | 2/2009 | McMullen et al. | |
| 7,502,795 B1 | 3/2009 | Svendsen et al. | |
| 7,584,268 B2 | 9/2009 | Kraus et al. | |
| 7,634,735 B2 | 12/2009 | McCary | |
| 7,676,505 B2 | 3/2010 | Chess et al. | |
| 7,797,274 B2 | 9/2010 | Strathearn et al. | |
| 7,831,579 B2 | 11/2010 | Wade et al. | |
| 7,900,149 B2 | 3/2011 | Hatcher et al. | |
| 7,904,450 B2 | 3/2011 | Wilson | |
| 7,954,052 B2 | 5/2011 | Curtis et al. | |
| 8,074,202 B2 | 12/2011 | Da Palma et al. | |
| 8,219,900 B2 | 7/2012 | Curtis et al. | |
| 2002/0077985 A1 | 6/2002 | Kobata et al. | |
| 2002/0143812 A1 | 10/2002 | Bedingfield | |
| 2003/0046363 A1 | 3/2003 | Ezato | |
| 2003/0046572 A1 | 3/2003 | Newman et al. | |
| 2003/0050976 A1 | 3/2003 | Block et al. | |
| 2003/0063770 A1 | 4/2003 | Svendsen et al. | |

(Continued)

OTHER PUBLICATIONS

Oracle, DBMS_OBFUSCATION_TOOLKIT, 2008, Oracle, Oracle® Database PL/SQL Packages and Types Reference 11g Release 1 (11.1), pp. 1.1-1.20.

(Continued)

*Primary Examiner* — Joshua Bullock

(57) ABSTRACT

Search and discovery enhanced by providing information context. Searchable content might be embedded in contexts, which describe or limit the content's intentionality. For health-care content, contexts might include symptoms, testing, diagnosis, treatment, indicators and contra-indicators, prognosis for recovery, and otherwise. A content publisher might describe the intended context for that content. A content reviewer might specify additional contexts for that content. Content searches are enhanced using those contexts; searches thus return information focused on those intended.

19 Claims, 7 Drawing Sheets

(56) References Cited

U.S. PATENT DOCUMENTS

| | | |
|---|---|---|
| 2003/0225853 A1 | 12/2003 | Wang et al. |
| 2004/0039795 A1 | 2/2004 | Percival |
| 2004/0088647 A1 | 5/2004 | Miller et al. |
| 2004/0117621 A1 | 6/2004 | Knight |
| 2004/0167989 A1 | 8/2004 | Kline et al. |
| 2004/0260933 A1 | 12/2004 | Lee |
| 2005/0027795 A1 | 2/2005 | San Andres et al. |
| 2005/0055424 A1 | 3/2005 | Smith |
| 2005/0091367 A1 | 4/2005 | Pyhalammi et al. |
| 2005/0120288 A1 | 6/2005 | Boehme et al. |
| 2005/0160359 A1 | 7/2005 | Falk et al. |
| 2005/0192881 A1 | 9/2005 | Scannell |
| 2005/0223061 A1 | 10/2005 | Auerbach et al. |
| 2005/0246283 A1 | 11/2005 | Gwiazda et al. |
| 2005/0262210 A1 | 11/2005 | Yu |
| 2005/0262439 A1 | 11/2005 | Cameron |
| 2005/0273489 A1 | 12/2005 | Pecht et al. |
| 2005/0273503 A1 | 12/2005 | Carr et al. |
| 2005/0273702 A1 | 12/2005 | Trabucco |
| 2006/0149567 A1 | 7/2006 | Muller et al. |
| 2006/0179075 A1 | 8/2006 | Fay |
| 2006/0218159 A1 | 9/2006 | Murphy et al. |
| 2006/0224952 A1 | 10/2006 | Lin |
| 2006/0236231 A1 | 10/2006 | Allen et al. |
| 2007/0011453 A1 | 1/2007 | Tarkkala et al. |
| 2007/0162459 A1 | 7/2007 | Desai et al. |
| 2007/0168859 A1 | 7/2007 | Fortes |
| 2007/0169165 A1 | 7/2007 | Crull et al. |
| 2007/0180240 A1 | 8/2007 | Dahl |
| 2007/0244906 A1 | 10/2007 | Colton et al. |
| 2008/0005284 A1 | 1/2008 | Ungar et al. |
| 2008/0010387 A1 | 1/2008 | Curtis et al. |
| 2008/0010609 A1 | 1/2008 | Curtis et al. |
| 2008/0071804 A1 | 3/2008 | Gunda et al. |
| 2008/0071901 A1 | 3/2008 | Adelman et al. |
| 2008/0107264 A1 | 5/2008 | Van Wie et al. |
| 2008/0208912 A1 * | 8/2008 | Garibaldi .................. 707/104.1 |
| 2008/0209345 A1 | 8/2008 | Cannata et al. |
| 2008/0222308 A1 | 9/2008 | Abhyanker |
| 2008/0229211 A1 | 9/2008 | Herberger et al. |
| 2008/0243852 A1 | 10/2008 | Brunner et al. |
| 2008/0270406 A1 | 10/2008 | Flavin et al. |
| 2008/0313260 A1 | 12/2008 | Sweet et al. |
| 2008/0319762 A1 | 12/2008 | Da Palma et al. |
| 2009/0007274 A1 | 1/2009 | Martinez et al. |
| 2009/0019366 A1 | 1/2009 | Abhyanker |
| 2009/0019367 A1 | 1/2009 | Cavagnari et al. |
| 2009/0055755 A1 | 2/2009 | Hicks et al. |
| 2009/0070426 A1 | 3/2009 | McCauley et al. |
| 2009/0100041 A1 | 4/2009 | Wilson |
| 2009/0119515 A1 | 5/2009 | Nicolson et al. |
| 2009/0187830 A1 | 7/2009 | Jorasch et al. |
| 2009/0265607 A1 | 10/2009 | Raz et al. |
| 2010/0125798 A1 | 5/2010 | Brookhart |
| 2011/0083090 A1 | 4/2011 | Gwiazda et al. |
| 2011/0239132 A1 | 9/2011 | Jorasch et al. |
| 2011/0307519 A1 | 12/2011 | Payzer et al. |

OTHER PUBLICATIONS

Oracle Forms Services and Oracle Form Developer 11g Technical Overview. Jun. 2009. Author Jan Carlin. Retrieved from http://www.oracle.com/technetwork/developer-tools/forms/overview/technical-overview-130127.pdf on Jan. 14, 2013. pp. 1-22.

Oracle® Coherence Developer's Guide. Release 3.7.1 Part No. E22837-01. Functional Descriptions. Chapter 1 © 2008. Retrieved from http://docs.oracle.com/cd/E24290_01/coh.371/e22837/gs_intro.htm#BABDDBAD on Jan. 14, 2013. 9 pages.

Oracle® Coherence Developer's Guide. Release 3.7.1 Part No. E22837-01. Functional Descriptions. Chapter 3 © 2008. Retrieved from http://docs.oracle.com/cd/E24290_01/coh.371/e22837/gs_config.htm#CEGJBDJD on Jan. 14, 2013. 22pages.

Filemaker® Pro 12. User's Guide. Chapter 4. Retrieved from http://www.filemaker.com/support/product/docs/12/fmp/fmp12_users_guide.pdf on Jan. 14, 2013. pp. 100-114.

Filemaker® Pro 12. User's Guide. Chapter 4. Retrieved from http://www.filemaker.com/support/product/docs/12/fmp/fm12_instant_web_publish_en.pdf on Jan. 14, 2013., pp. 26-37.

VFabric GemFire User's Guide Retrieved from http://pubs.vmware.com/vfabric52/topic/com.vmware.ICbase/PDF/vfabric-gemfire-ug-6.6.4.pdf on Jan. 14, 2013. 756 pages.

\* cited by examiner

ENHANCING CONTENT USING LINKED CONTEXT

RELATED APPLICATIONS

This application claims priority of the following related applications: U.S. Provisional Patent Application Ser. No. 61/275,496, filed Aug. 31, 2009, in the name of the same inventor, titled "Classifying Internet and Intranet Content for Search and Discovery"; and any other applications or documents from which this application may lawfully claim priority. Each of these documents is hereby incorporated by reference as if fully set forth herein. These documents are sometimes referred to herein as part of the "Incorporated Disclosures".

BACKGROUND

Due at least in part to the extremely large amount of data available for search on the Internet, and due at least in part to the relatively unstructured nature of that data, it can be difficult or inconvenient to search for information on a relatively specific topic. While there are a number of known methods for search of large unstructured data libraries, these known methods are generally limited by their inability to focus on topics of relative specificity, particularly when the searcher is already aware of the type of information being looked for.

For example, classic key-word search engines, even those which have been enhanced with additional technologies such as Google's "PageRank" feature, provide many, many sources of information that might be relevant to the searcher's topic. However, the sheer number of those sources can overwhelm even the most dedicated searcher. For example, in an informal test, the inventor found that a search for the phrase "breast cancer" (note: not the individual words, but the particular phrase as a word-pair) yielded over 128,000,000 entries when searched by Google. While this number of responses is likely to be relatively complete, it has the drawback of probably burying information the searcher is looking for in a haystack of dross.

Similarly, those searches which rely on human-created taxonomies, such as for example the Open Directory Project, have the drawback that they can become swamped by the relatively large amount of information available, and by the rate at which that information changes, is updated, or becomes obsolete. Moreover, while human-created taxonomies have the advantage of actually applied brainpower to development of the taxonomy, it often occurs that the taxonomy chosen by the editors is not suited to searches of interest to particular users. For example, in an informal search for peer-reviewed articles on medical information, the inventor found that there was no shortage of information available for the lay public, but that documents addressed to those able to interpret the technical jargon of the field were difficult to separate from those which were simply overview articles.

Among other known methods include content-consolidators, such as for example WebMD and UpToDate. As with human-created taxonomies, while these sources provide a valuable resource to those searchers who are becoming familiar with their topic of interest, they have the drawback that they often lack depth. As with human-created taxonomies, they serve a public which is relatively unfamiliar with technical information, with the effect that the effort devoted by such consolidators is often relatively limited when detailed technical information is desired.

Among other known methods are web-based encyclopedias, sometimes appearing in moderated form (such as for example Scholarpaedia) and sometimes appearing in a relatively more informal form (such as for example Wikipedia or Google Knol). Persons actually skilled in the fields in which they search might become frustrated or even misinformed by the weight of so many authors weighing in on topics which both involve professional knowledge and are not of wide public interest. Even then, some professional topics have become the subject of public debate, with the result that articles written by even relatively known authors, vetted by a very large web community, can become unreliable for documentable facts.

As one strong advantage of Internet search is the wide variety of information available to searchers, the difficulty posed by having that information obscured by relatively irrelevant or even inaccurate information detracts substantially from Internet search. At present, there are no known methods which provide a method of search which is simultaneously comprehensive, convenient, substantially accurate, and which provides information suited to the nature of the search.

Readers are encouraged and exhorted to make their own evaluation of known methods.

SUMMARY OF THE DESCRIPTION

This description includes techniques, including methods, physical articles, and systems, which provide for searching for and discovering information, where those operations of search and discovery are enhanced by providing context for the information being searched.

In one embodiment, searchable information (sometimes herein called "content") might be embedded in one or more contexts, each of which describes or otherwise limits intentionality of the content. For example and without limitation, where the content relates to health-care, one or more contexts might relate to symptoms, testing, diagnosis, treatment, indicators and contra-indicators, prognosis for recovery, and otherwise. A content publisher might describe the context in which the content is contemplated to be used. Alternatively, a reviewer of that content might specify other and further contexts in which that content might be used.

Content searches are enhanced by taking into consideration those contexts in which content has been classified, with the effect that searches that might otherwise return substantial irrelevant information (coincidentally matching keywords or other content descriptors or specifiers) are instead focused on those contexts in which the particular content descriptors or specifiers are relevant to both the context and to the content being searched-for. This has the effect that searchers might focus their efforts on found content that is particular to the interest of the searcher.

DESCRIPTION

Generality of the References

Figure 1:
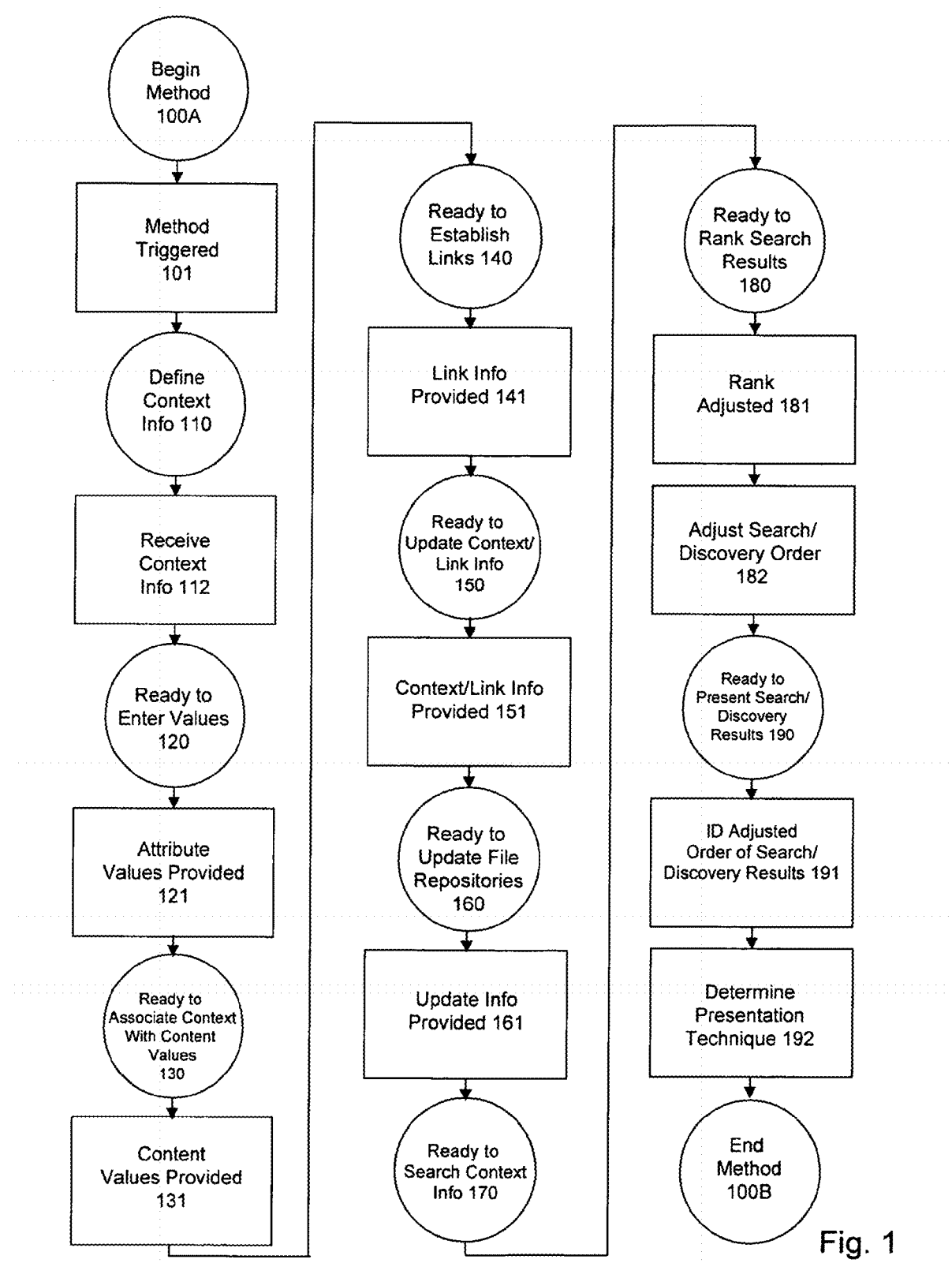
FIG. 1 shows a conceptual drawing of a method.

This application should be read in the most general possible form. This includes, without limitation, the following:

References to Contemplated causes and effects for some implementations do not preclude other causes or effects that might occur in other implementations.

References to particular reasons or to particular techniques do not preclude other reasons or techniques, even if completely contrary, where circumstances would indicate that the stated reasons or techniques are not as applicable.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to specific techniques include alternative and more general techniques, especially when discussing aspects of the invention, or how the invention might be made or used.

Generality of the Description

Technologies shown or suggested by this description should also be thought of in their most general possible form. This includes, without limitation, the following:

The terms "constantly", "continually", "from time to time", "occasionally", "periodically" (and similar terms and phrases) generally indicate any case in which a method or technique, or an apparatus or system, operates over a duration of time, including without limitation any case in which that operation occurs only part of that duration of time. For example and without limitation, these terms would include, without limitation, methods which review a status as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The terms "effect", "with the effect of" (and similar terms and phrases) generally indicate any natural and probable consequence, whether or not assured, of a stated arrangement, cause, method, or technique, without any implication that an effect or a connection between cause and effect are intentional or purposive.

The terms "methods, physical articles, and systems", "techniques" (and similar terms and phrases) generally indicate any material suitable for description, including without limitation all such material within the scope of patentable subject matter, or having ever been considered within the scope of patentable subject matter, or which might colorably be within the scope of patentable subject matter, notwithstanding most recent precedent.

The terms "pseudo-random", "random" (and similar terms and phrases) generally indicate any technique of any kind, in which information is generated or selected in a manner not predictable to the recipient. In the context of the invention, data, information, numbers, processes, or otherwise, referred to herein as "random", need not be equidistributed over anything in particular.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Real-World Nature

The invention includes techniques, including methods, physical articles, and systems, that receive real-world information dictated by real-world conditions (not mere inputs to a problem-solving technique). The techniques provided by the invention are transformative of the information received, at least in the sense that incoming context information and content information are collected and maintained in a format suitable for search, discovery, and comparison. This has the effect that a $1^{st}$ type of information (such as for example, context information) is transformed into a $2^{nd}$ type of information (such as for example, search ranking information).

The invention includes techniques that are tied to a particular machine, at least in the sense that particular types of communication and computation, by particular types of devices, are performed in a communication network, or other data access environment. While this description is primarily directed to that portion of the invention in which data is collected in a communication network, in the context of the invention, there is no particular requirement for any such limitation. For example and without limitation, the techniques described herein might be applied to in any data access environment, such as for example an environment in which data is accessed from a logically or relatively remote site by one or more users attempting to perform search or discovery of relevant content with respect to a particular set of context information.

This description includes a preferred embodiment of the invention with preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

DEFINITIONS AND NOTATION

The following definitions are exemplary, and not intended to be limiting in any way:

The terms "communication network", "network" (and similar terms and phrases) generally indicate any set of devices operating with the effect of cooperating to couple information from one or more senders to one or more recipients, the set of senders and the set of recipients being free to overlap. In the context of the invention, a communication network need not be uniform or even compatible across the network in techniques used to send or receive information, need not be physically compact, connected, or continuous, might be dynamic, static, or otherwise, and need not indicate any particular intentional design.

After reading this application, those skilled in the art would recognize that these definitions would be applicable to techniques, methods, physical elements, and systems—not currently known, or not currently known to be applicable by the techniques described herein—including extensions thereof that would be inferred by those skilled in the art after reading this application, even if not obvious to those of ordinary skill in the art before reading this application.

FIGURES AND TEXT

Where described as shown in a figure, an element might include
  other items shown in the figure in addition to, or operating in combination or conjunction with, that particular element (or that particular element in combination or conjunction with other elements, whether shown or not shown in the figure, and whether described or not described with respect to the figure);
  other items not shown in the figure, but whose inclusion would be known to those skilled in the art, or which would be known after reasonable investigation, without further invention or undue experimentation; and
  subparts of that element, whether shown or not shown in the figure, which might be convenient for operation of the element, but which are not necessarily required in the described context, or which might be necessary for operation of the element in the described context, but which are not necessary for description at a level understandable to those skilled in the art.

FIG. 1

FIG. 1 shows a conceptual drawing of a method 100, including flow labels and method steps as shown in the figure.

As described herein, the method steps are shown in the figure and described in a linear order. However, in the context of the invention, there is no particular requirement that the flow labels or method steps be encountered or performed linearly, in any particular order, or by any particular device. For example and without limitation, the flow labels and method steps might be encountered or performed in parallel, in a pipelined manner, by a single device or by multiple devices, by a general-purpose processor or by a special-purpose processor (or other special-purpose circuitry disposed for carrying out part or all of the method 100), by one or more processes or threads, at one or more locations, and in general, using any one or more of the techniques known in the many arts of computing science.

Beginning of Method

Reaching a flow label 100A indicates a beginning of the method 100.

At a step 101, the method 100 is triggered and begins operation. In various embodiments, the method 100 might be triggered by one or more of the following:
  creation or publication of content or other searchable information;
  associating such content with one or more sets of context information; and
  attempting to search that content or other searchable information; or
  by other techniques or triggers, such as for example those known in the many fields of computing science.

Although embodiments are described with respect to specific techniques for triggering the method 100, such as in this step, in the context of the invention, there is no particular requirement for use of these or any other particular techniques. The method 100 might be triggered, such as in this step, by any technique suitable for triggering a computation, method, or process.

The method 100 proceeds with the flow label 110.

Creating Context Definitions

Reaching a flow label 110 indicates that one or more users 111 (such as for example one or more content providers or one or more context providers) are ready to define context information, sometimes referred to herein as a context schema or a set of context definitions.

At a step 112, the method 100 receives context information, such as in the form of a context schema in a context schema format. A context schema format might include unformatted information, or might preferably include formatted information such as XML data, an XML data definition, or an XML data structure.

As part of this step, the one or more users 111 might define the nature of the context information, including the structure of the context schema, attributes associated with the context schema, and possible values for those attributes that are considered valid for the context schema.

The method 100 proceeds with the flow label 120.

Entering Context Information

Reaching a flow label 120 indicates that the one or more users 111 are ready to enter values for the attributes defined for the context information. Differing values might be entered for distinct context schemae or distinct context definitions.

At a step 121, the one or more users 111 provide attribute values for the attributes associated with their particular context schemae. For example and without limitation, in a health-care embodiment, a $1^{st}$ context schema might be associated with one or more of the following:
  a set of symptoms as presented or measured with respect to a particular patient,
  a set of symptoms as presented or measured with respect to a particular class of patients, a set of symptoms as presented or measured with respect to a particular disease or class of diseases, or a set of symptoms as presented or measured with respect to other aspects of health care. For example and without limitation, these might include a set of symptoms as presented or measured with particular respect to burn victims.

As noted herein, in a health-care embodiment, a $1^{st}$ context schema might be associated with one or more of a set of symptoms or observations;

a set of testing values, or ranges thereof;

a set of diagnoses, including for example a confidence or likelihood associated with those diagnoses;

a set of treatments associated with one or more diagnoses, including for example a degree of confidence or likelihood that one or more of those treatments would be safe and effective in response to a disease for which those one or more diagnoses are associated;

a set of indicators or contra-indicators, such as for example factual observations or logical conclusions which would tend to assign a relatively higher or relatively lower degree of confidence or likelihood in one or more such sets of treatments;

a set of prognoses, such as for example a set of one or more expected results from treatment, or a set of one or more distinctions between results from treatment to be expected from distinct actual causes associated with those symptoms or observations;

a set of recovery indicators or contra-indicators, such as for example factual observations or logical conclusions which would tend to assign a relatively higher or relatively lower degree of confidence or likelihood that the chosen set of treatments are effective.

For example and without limitation, one or more users 111 might enter values for such attributes which would indicate context information associated with one or more of the above.

The method 100 proceeds with the flow label 130.

Associating Context with Content

Reaching a flow label 130 indicates that the one or more users 111 are ready to associate context information with particular content values. For example and without limitation, in a health-care embodiment, context information associated with a burn victim might include content values indicative of reddened skin or heat-induced blistering.

At a step 131, the one or more users 111 provide particular content values to be associated with distinct context schemae. Although this description is primarily with respect to substantially disjoint context schemae, in the context of the invention, there is no particular requirement therefor. For example and without limitation, one or more such content values might indicate a relatively greater or relatively lesser degree of confidence or likelihood for an indicated distinct context. One such example might include the possibility that the patient has reddened skin; this could be indicative of a burn, or alternatively could be indicative of elevated body temperature, excessive blood flow, or other medical conditions.

The method 100 proceeds with the flow label 140.

Publishing Context for Content

Reaching a flow label 140 indicates that the method 100 is ready to establish links between a $1^{st}$ set of context schemae and either a $2^{nd}$ set of context schemae or a set of particular content values. In one embodiment, being ready to "establish" links also includes, without limitation, removing links; adding to, altering, amending, or modifying links; and other operations that might be performed with respect to links between context and content, or between a $1^{st}$ context and a $2^{nd}$ context.

At a step 141, the one or more users 111 provide information interpretable by the method 100 to link particular contexts with particular content, or to link particular $1^{st}$ contexts with particular $2^{nd}$ contexts. Although this description is primarily with respect to individual contexts and content, in the context of the invention, there is no particular requirement therefor. For example and without limitation, one or more particular contexts might be associated with a plurality or other set of content information, while similarly, one or more particular $1^{st}$ contexts might be associated with a plurality or other set of $2^{nd}$ contexts.

The method 100 proceeds with the flow label 150.

Publishing Context for Content

Reaching a flow label 150 indicates that the method 100 is ready to update context information and link information, such as for example in a networking environment (such as the Internet, or such as for example an intranet, enterprise network, extranet, virtual private network, switching network, or other techniques for accessing data). In one embodiment, being ready to "update" context information or link information includes, without limitation, adding associations between context information and link information, removing associations between context information and link information, adding to, altering, amending, or modifying associations between context information and link information; and other operations that might be performed with respect to associations between context information and link information.

At a step 151, the one or more users 111 provide information interpretable by the method 100 to update context information and link information, as described above. Although this description is primarily with respect to individual associations of context information and link information, in the context of the invention, there is no particular requirement therefor. For example and without limitation, one or more particular contexts might be associated with a plurality or other set of link information, while similarly, one or more particular sets of link information might be associated with a plurality or other set of context information.

In one embodiment, repositories of information, such as for example databases associating context information and link information, might be published for general availability in a networking environment, such as for example the Internet or other networking environments described above. General availability in a networking environment might also include access controls, including without limitation authentication procedures.

The method 100 proceeds with the flow label 160.

Updating Profile Repositories

Reaching a flow label 160 indicates that the method 100 is ready to update profile repositories. As described above, this might include making those updates available in a networking environment, with or without access control, such as for example with or without authentication procedures.

At a step 161, the one or more users 111 provide information interpretable by the method 100 to update profile repositories and to make those updated profile repositories available in a networking environment or other data-access environment, as described above.

The method 100 proceeds with the flow label 170.

Searching or Discovering Context

Reaching a flow label 170 indicates that the method 100 is ready to search context information, or otherwise discover context information, associated with a search context provided by one or more users 111. In one embodiment, these one or more users 111 might include entities with no particular privileged access to the context information and content information; however, in the context of the invention, there is no particular requirement therefor.

For example and without limitation, at least some users 111 might have relatively privileged access (such as for example if those users 111 represent administrators) or relatively unprivileged access (such as for example if those users 111 represent guests or impromptu users of guest services), with consequent effect on the method 100 allowing them to access selected context information or content information. For one example, in a health-care environment, it might occur that the method 100 is disposed to allow relatively privileged access to researchers and other medical personnel, with the effect that those medical personnel might conduct the medical research the method 100 is providing access to, while it might occur that the method 100 is disposed to allow only relatively unprivileged access to individual patients, with the effect that individual patients are not generally allowed to review medical records of persons other than themselves.

Any one of a relatively large number of search or discovery techniques, including those search techniques or machine learning techniques known in the many fields of computing science, might be used by the method 100 to perform search and discovery of context information, context schemae, content information, or combinations or conjunctions thereof, in response to requests (explicit or implied) by users 111.

The method 100 proceeds with the flow label 180.

Ranking Search Results

Reaching the flow label 180 indicates that the method is ready to rank search results for content information, in response to context information.

At a step 181, the method 100 adjusts the rank to be relatively superior when context information is a relatively closer match, and adjusts the rank to be relatively inferior when context information is a relatively farther match, even if the content information is otherwise matched at nearly the same degree.

At a step 182, the method 100 adjusts the ordering of search or discovery results in response to the adjustment of rank that was made in the just-earlier step.

The method 100 proceeds with the flow label 190.

Presenting Search Results

Reaching the flow label 190 indicates that the method is ready to present search or discovery results to the one or more users 111 making requests for search or discovery of content information (in context).

At a step 191, the method 100 identifies the adjusted ordering of search or discovery results provided with respect to the just-earlier flow label.

At a step 192, the method 100 determines a technique for presentation which gives relatively greater prominence to those search or discovery results which were deemed relatively superior with respect to the just-earlier flow label. For example and without limitation, the method 100 might present relatively superior results in one or more of the following ways:

first, or near the beginning of, a relatively ordered list;
highlighted or otherwise emphasized, such as with text size, text font, color, blinking, or other indicators likely to attract the user 111;
in one or more categories, such as for example clustered into groups with relatively similar associated ranking;
or by other techniques known in the many fields of computing science to give relative emphasis to those results deemed relatively superior.

End of Method

Reaching a flow label 100B indicates an end of the method 100. In one embodiment, the method 100. In one embodiment, the method 100 might be readied for re-performance in response to a trigger as described with respect to the flow label 100A.

FIG. 2

Figure 2:
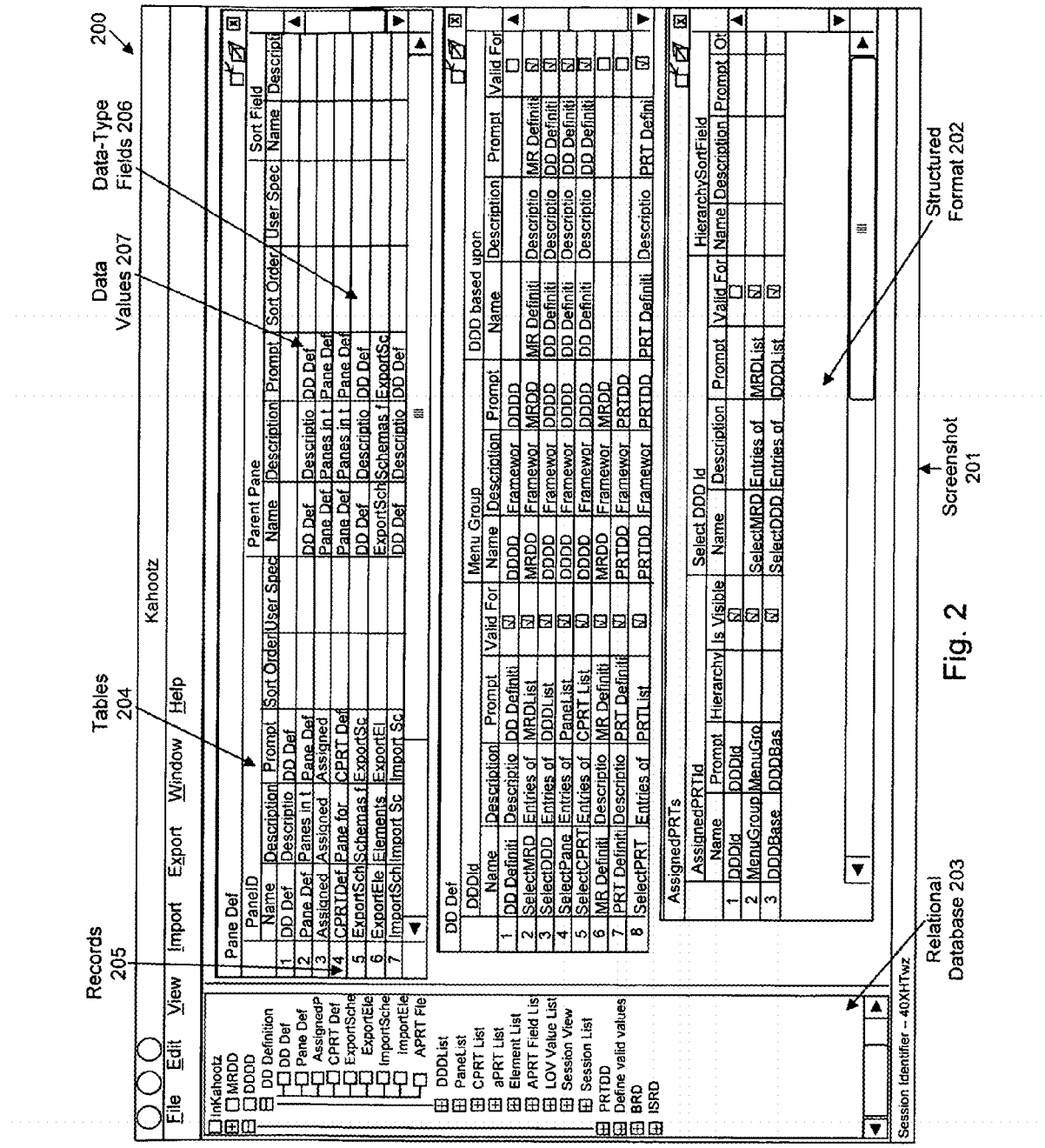
FIG. 2 shows a conceptual drawing of a $1^{st}$ user interface.

FIG. 2 shows a conceptual drawing of a $1^{st}$ user interface 200, including elements shown in the figure, including at least a screenshot 201 of the $1^{st}$ user interface 200 for allowing one or more users 111 to define context information.

In one embodiment, one or more users 111 might define context information in a structured format 202 similar to a relational database 203, including tables 204 defined with respect to that database 203, records 205 defined with respect to those tables 204, data-type fields 206 defined with respect to those records 205, and data values 207 defined with respect to those data-type fields 206. After reading this application, those skilled in the art would understand how to make and use a structured format similar to a relational database to achieve the purposes described herein. Other structured formats might include XML data structures, as described herein in more detail, or other structured formats known in the many fields of computing science.

In one embodiment, one or more users 111 might define context information using a GUI (graphical user interface) to enter and move data elements within the structured data format 202, with the effect that the one or more users 111 should be able to create, add to, modify, delete from, and remove elements of that structured data format 202.

FIG. 3

Figure 3:
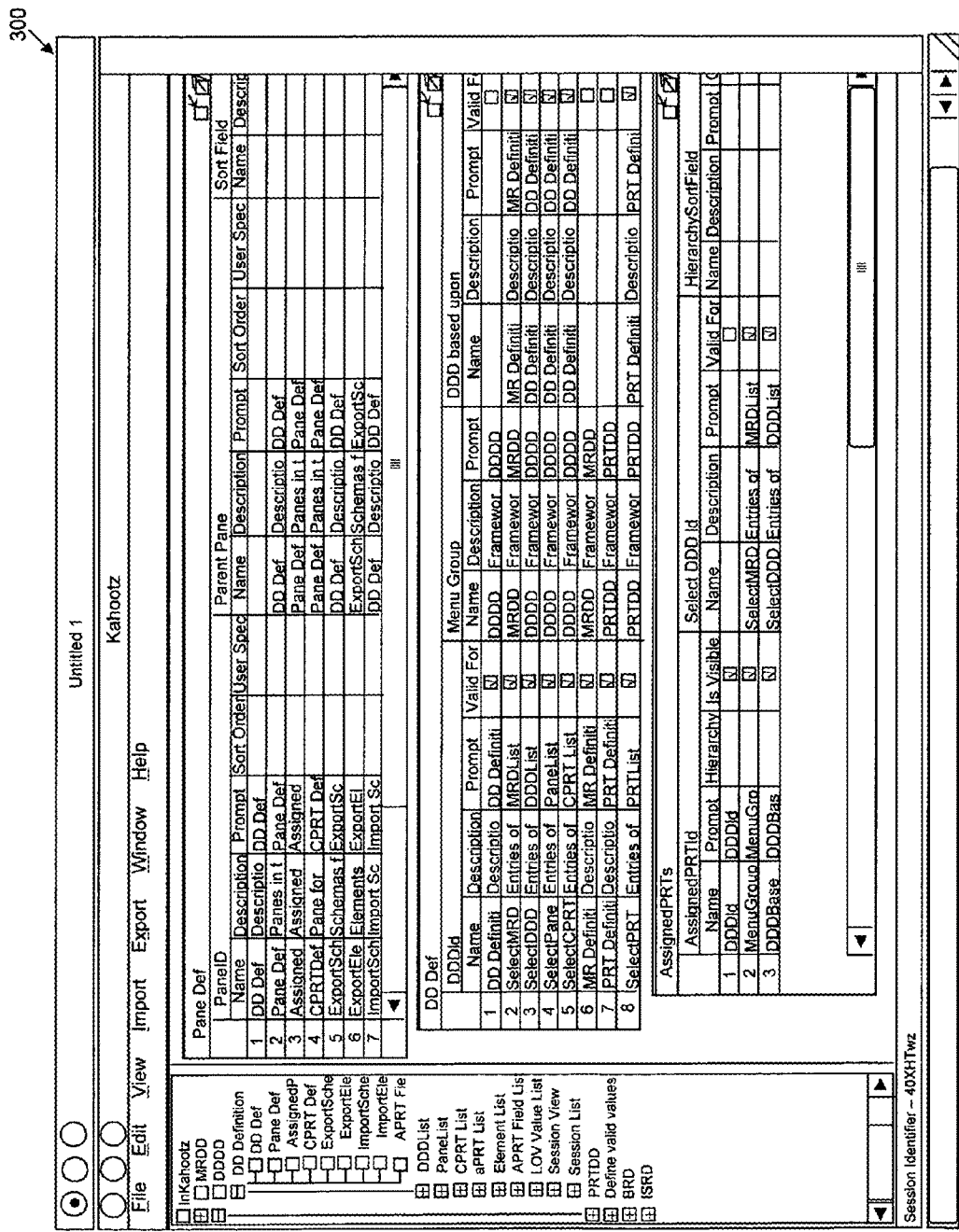
FIG. 3 shows a conceptual drawing of a $2^{nd}$ user interface.

FIG. 3 shows a conceptual drawing of a $2^{nd}$ user interface 300, including elements shown in the figure, including at least a screenshot 301 of the $2^{nd}$ user interface 300 for allowing one or more users 111 to define at least those portions of context information with respect to element variable values.

FIG. 4

Figure 4:
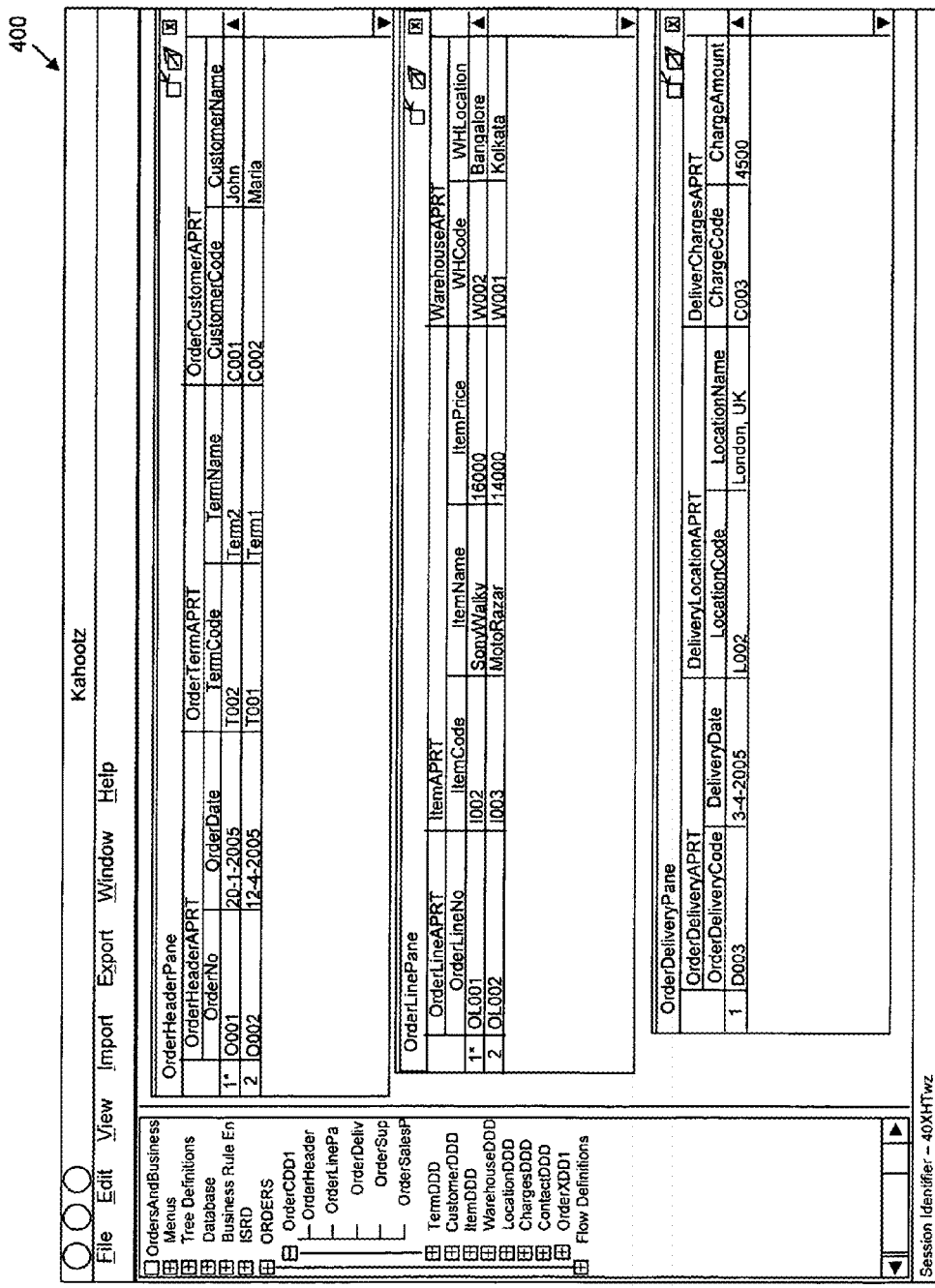
FIG. 4 shows a conceptual drawing of a $3^{rd}$ user interface.

FIG. 4 shows a conceptual drawing of a $3^{rd}$ user interface 400, including elements shown in the figure, including at least a screenshot 401 of the $3^{rd}$ user interface 400 for allowing one or more users 111 to define at least portions of context information.

FIG. 5

Figure 5:
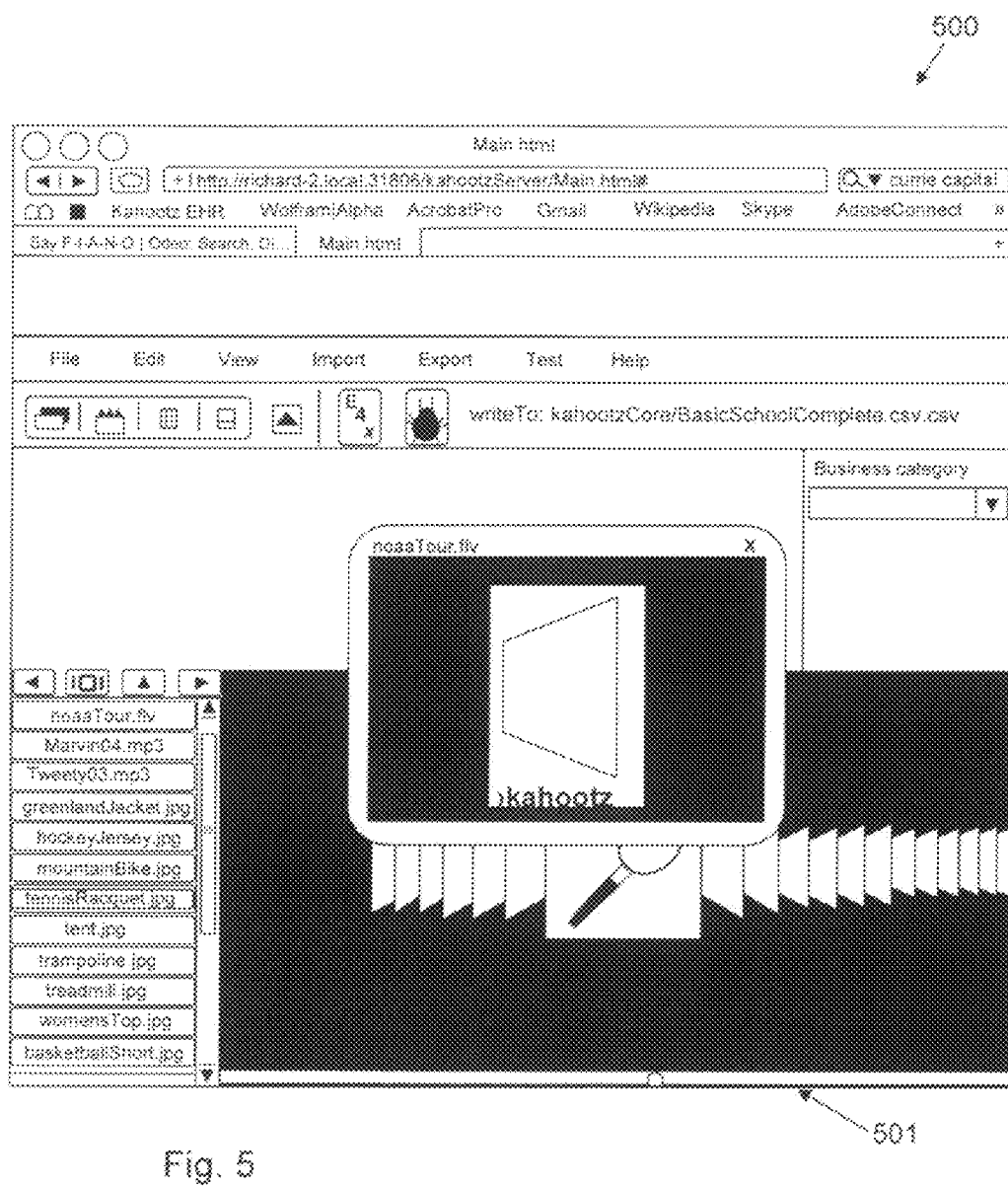
FIG. 5 shows a conceptual drawing of a $4^{th}$ user interface.

FIG. 5 shows a conceptual drawing of a $4^{th}$ user interface 500, including elements shown in the figure, including at least a screenshot 501 of the $4^{th}$ user interface 500 for allowing one or more users 111 to present context and content found by search.

FIG. 6

Figure 6:
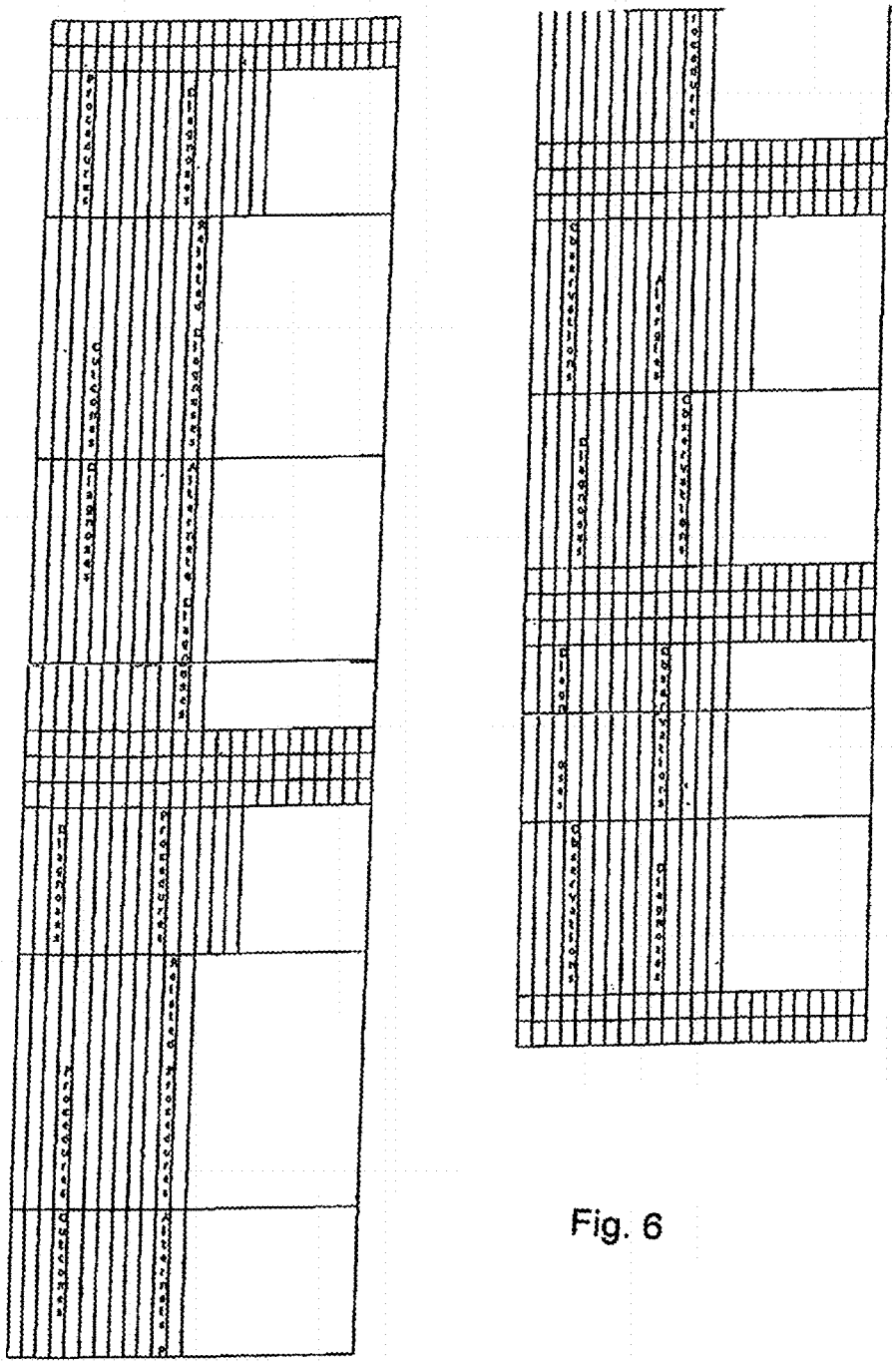
FIG. 6 shows a conceptual drawing of a set of sample context schemae.

FIG. 6 shows a conceptual drawing of a set of sample context schemae, including elements shown in the figure.

FIG. 7

Figure 7:
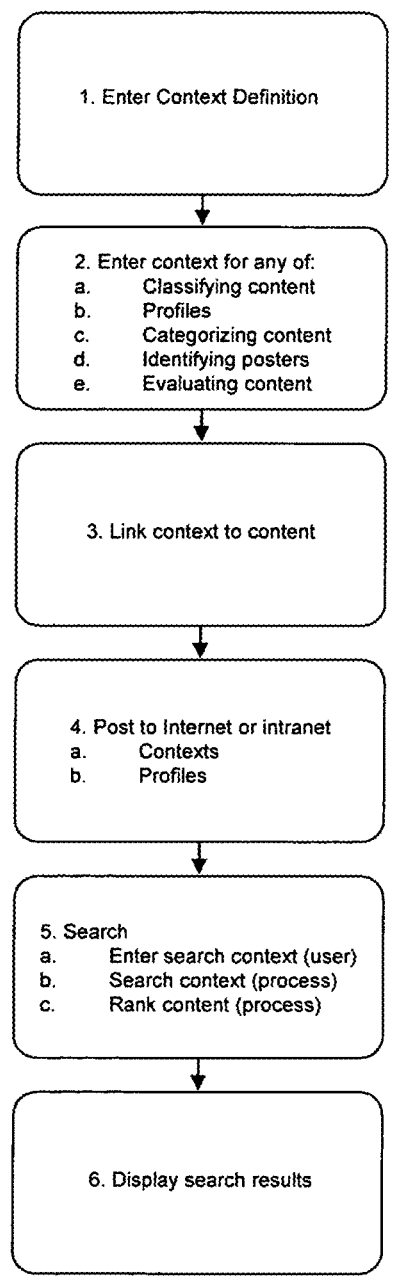
FIG. 7 shows an alternative conceptual drawing of a process flow.

FIG. 7 shows an alternative conceptual drawing of a process flow including the flow labels and method steps as described with respect to the FIG. 1.

Alternative Embodiments

The invention has applicability and generality to other aspects of information search and discovery, machine learning, system management, and system reporting, including at least search and discovery of information with particular relevance to relatively specific topics, such as for example those sufficiently specific that it would be possible to pose the research question to an expert in the field (if one could be conveniently found); and comparison and research of information relating to specific characteristics of a topic, such as for example comparison of particular features for processes or products (not already covered by general consumer-product reviews).

TECHNICAL APPENDIX

This application includes the following technical appendix:
a 23 page, unpublished document, titled "Classifying Internet and Intranet Content for Search and Discovery", also known as U.S. Provisional Patent Application Ser. No. 61/275,496, filed Aug. 31, 2009, in the name of the same inventor, titled "Classifying Internet and Intranet Content for Search and Discovery"; and
any other applications or documents logically or physically enclosed with this application.

Each of these documents is hereby incorporated by reference as if fully set forth herein. These documents are sometimes referred to herein as part of the "Incorporated Disclosures" or "Technical Appendix".

The invention claimed is:

1. A method, including steps of
by a server, maintaining documents including searchable content,
the searchable content associated with
(1) content schemas, the content schemas including, for each document, an organization thereof, the organization including a hierarchy of elements that can have values, and
(2) context information, the context information relating to a least one intentionality of said content, said intentionality of said content including one or more context schemas, said context schemas including formatted information, said formatted information being formatted by a user of said user in response to said intentionality of said content,
the formatted information including a hierarchy of elements each associated with a selected value;
by said server, receiving a search request for said searchable content, the search request including an intentionality of said search request, the intentionality of the search request including a second hierarchy of named elements each associated with a selected value;
conducting a search for said searchable content in response to said search request, the search providing results in response to whether the elements in the searchable content have values like the values in the search request;
ranking the results of that search request, in response to a measure of similarity between said formatted information of the context information and the intentionality of the search request.

2. A method as in claim 1, wherein
said hierarchy of values includes two or more levels in the hierarchy; and
the hierarchy is organized with differing elements or differing values occupying differing levels of the hierarchy.

3. A method as in claim 1 wherein
said hierarchy of values includes a tree structure.

4. A method, including steps of
receiving, at a server, from one or more users conducting a search, searchable content and context information, said context information including one or more context schema, said intentionality of said content including one or more context schemas, said context schemas including formatted information, said formatted information being formatted by a user of said user in a hierarchy of elements each associated with a selected value in response to said intentionality of said content;
said context schema including formatted information, said formatted information defining attributes to which values can be assigned in a hierarchy of elements with associated values, the hierarchy defining a tree structure having two or more levels;
by said server, associating said searchable content with both content schemas, said content schemas including for each element of searchable content an organization thereof, the organization including a hierarchy of elements that can have values, and context information, said context information relating to an intentionality of said content;
wherein
the server ranks results of search requests in response to whether elements in said context schemas for said searchable content are like elements in said formatted information, said formatted information being formatted by a user of said user in response to said intentionality of said content.

5. A method as in claim 4, wherein
said formatted information includes one or more markup language schema definitions; and
including steps of
describing context information using selection of one or more attributes to which values can be assigned, using inclusion of those attributes in the formatting information, and using association of selected values in the formatting information for those attributes.

6. A method as in claim 5, wherein
said searchable context information includes values to be assigned to said attributes; and including steps of
associating said searchable context information with second context information, said second context information being supplied by an entity other than said supplier of said one context information.

7. A method, including steps of
by a server, maintaining elements of content, said elements of content organized in response to content schemas, the content schemas including, for each element of content, a hierarchy of elements that can have values;
by said server, receiving one or more context schema, said context schema each including information formatted in an hierarchical structure having two or more levels, the information including selected elements and selected values associated with those elements, said hierarchical structures each including at least some information non-derivable from said content;
by said server, receiving one or more instances of said context schema from one or more users, at least some of said elements of content being tagged with said instances of said context schema by said users;
by said server, receiving one or more specifications from said users, said specifications being sufficient to identify content tagged with at least some of said instances of said context schema, and in response to said specifications, identifying said tagged content to said users;

ranking the results of a search of those elements of content in response to whether context schema associated with particular ones of those elements of content are like specifications received from said users.

8. A method as in claim 7, wherein
said context information includes one or more cases in which said content is contemplated to be used.

9. A method as in claim 7, wherein
said context information includes information relating to one or more of symptoms, testing, diagnosis, treatment, indicators, contra-indicators, prognosis, or recovery.

10. A method as in claim 7, including steps of
by said server, identifying said tagged content in response to matching at least portions of said elements of content with said specifications;
wherein matching particular ones of said elements of content with said specifications includes determining whether one or more selected elements with values at a first level in said hierarchy of elements are like a selected value associated with a selected element in said specifications, said selected element being at a second level in a second hierarchy of elements, said second level differing from said first level.

11. A method as in claim 10, including steps of
ranking said identified tagged content in response to said matching at least portions of said elements of content with said specification.

12. A method as in claim 7, including steps of
by said server, in response to said instances of said context schema, said instances of context schema including matchable elements, identifying secondary instances of said context schema having said elements;
in response to said secondary instances, identifying secondary said tagged content to said users.

13. A method as in claim 12, including steps of
collectively ranking said identified tagged content and said secondary tagged content
in response to matching at least portions of said identified tagged content and secondary tagged content.

14. A method as in claim 7, including steps of
by said server, receiving information interpretable as instructions by a computing device coupled to said server;
said instructions being performed by said computing device, in response to said identifying of said tagged content to said users.

15. A method as in claim 7, wherein
at least one said element of content is tagged with more than one said instance of a context schema.

16. A method as in claim 7, wherein
at least one said instance of a context schema includes one or more of
a tag associated with more than one said element of content,
at least some matchable values embedded therein,
at least some values external to said elements of content.

17. A method as in claim 7, wherein
one or more of said context schema includes one or more of
in its hierarchical structure, exemplar elements and values associated therewith,
an identification of a classification of said content.

18. A method as in claim 7, wherein
said instances of context schema relate to at least one intentionality of said users with respect to said content.

19. A method as in claim 7, wherein
said specifications from said users include one or more search criteria related to said content.

* * * * *